US007883144B2

(12) United States Patent
Brunner

(10) Patent No.: US 7,883,144 B2
(45) Date of Patent: Feb. 8, 2011

(54) VEHICLE SEAT WITH ADJUSTABLE AND RETRACTABLE HEAD RESTRAINT

(75) Inventor: Stefan Brunner, Allershausen (DE)

(73) Assignee: Lear Corporation, Southfield, MI (US)

( * ) Notice: Subject to any disclaimer, the term of this patent is extended or adjusted under 35 U.S.C. 154(b) by 58 days.

(21) Appl. No.: 12/277,503

(22) Filed: Nov. 25, 2008

(65) Prior Publication Data

US 2009/0179476 A1 Jul. 16, 2009

(30) Foreign Application Priority Data

Jan. 11, 2008 (DE) ....................... 10 2008 004 022

(51) Int. Cl.
*A47C 1/036* (2006.01)
*A47C 7/36* (2006.01)

(52) U.S. Cl. ......................................... 297/61; 297/410

(58) Field of Classification Search .................. 297/61, 297/410, 408, 378.12
See application file for complete search history.

(56) References Cited

U.S. PATENT DOCUMENTS

| | | | | |
|---|---|---|---|---|
| 5,816,658 | A | 10/1998 | Wallis | |
| 6,390,558 | B2 | 5/2002 | Fischer et al. | |
| 7,108,327 | B2 | 9/2006 | Locke et al. | |
| 7,316,455 | B2 * | 1/2008 | Metz et al. | 297/410 X |
| 7,631,930 | B2 | 12/2009 | Muller et al. | |
| 2009/0033137 | A1 | 2/2009 | Brunner | |

FOREIGN PATENT DOCUMENTS

| | | | |
|---|---|---|---|
| DE | 4319120 | A1 | 12/1994 |
| DE | 19648321 | A1 | 6/1997 |
| DE | 19744562 | A1 | 4/1999 |
| DE | 10104386 | | 7/2002 |
| DE | 10104386 | A1 | 7/2002 |
| DE | 10257227 | A1 | 7/2004 |
| EP | 0965481 | A1 | 12/1999 |
| EP | 0965482 | A1 | 12/1999 |
| GB | 2340744 | A | 3/2000 |
| WO | 2006050990 | A1 | 5/2006 |

OTHER PUBLICATIONS

Great Britain Office Action for corresponding Application No. GB0900112.4, mailed Apr. 1, 2009, 7 pages.

* cited by examiner

*Primary Examiner*—Anthony D Barfield
(74) *Attorney, Agent, or Firm*—Brooks Kushman P.C.

(57) ABSTRACT

A vehicle seat is provided with a guide within a seat back frame for movement between extended and retracted positions. A biasing member within the seat back frame biases the guide toward the retracted position. A cable extends the guide toward the extended position. A rotary actuator extends and retracts the cable. A release mechanism secures the guide in the extended position. A rod extends from the frame and has a plurality of notches for providing a series of height adjustment positions. A locking member within the guide retains the rod at one of the series of height adjustment positions. A head restraint is mounted on the rod. Actuation of the release mechanism and the rotary actuator releases the guide to retract the head restraint. Return actuation of the rotary actuator returns the guide and the rod to the extended position.

18 Claims, 5 Drawing Sheets

42
20
36
48
30
34
24
26
29
32
28
22
38

66
58
55
56
48
82
68
80
70
28
38
74
76
78
38
28
72
44
40
X 66
56
64
48
40
55
82
68
80
70
38
28
74
76
78
38
28
72
58
44

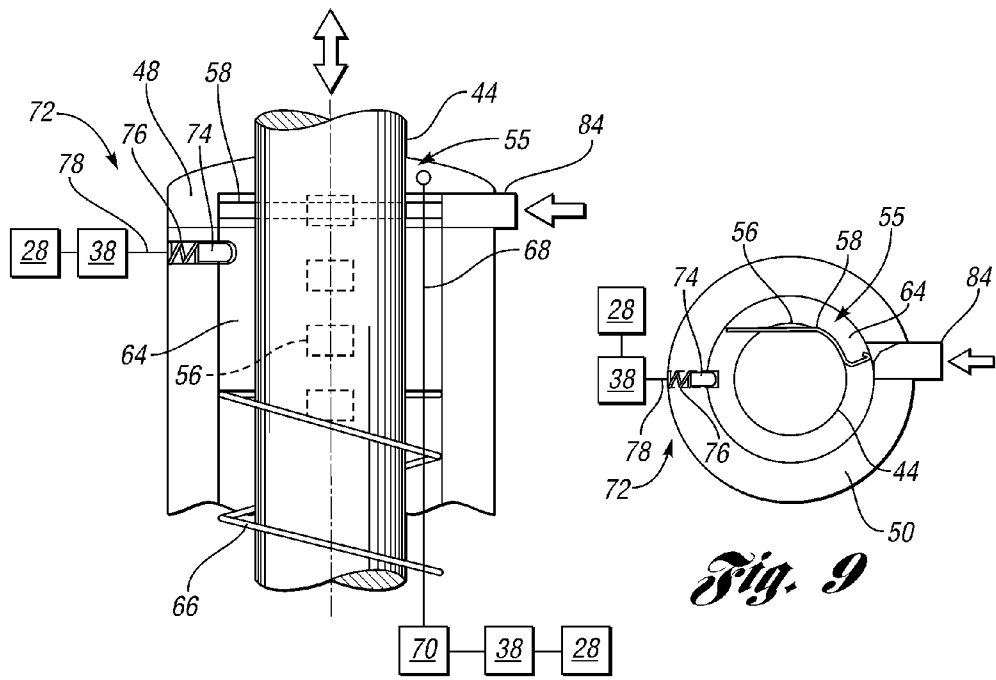
Fig. 9
Fig. 8
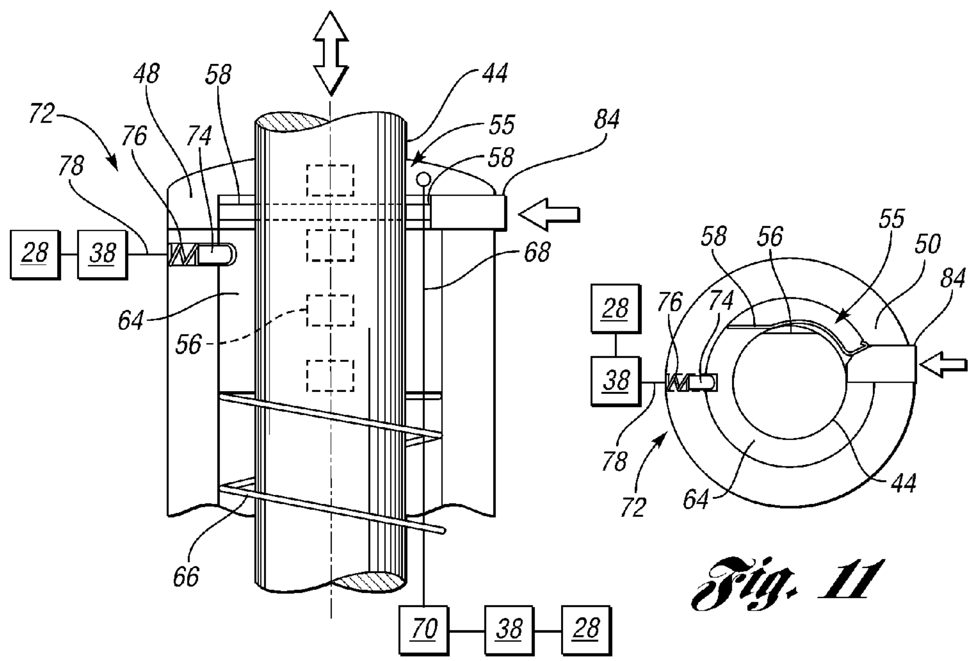
Fig. 11
Fig. 10

VEHICLE SEAT WITH ADJUSTABLE AND RETRACTABLE HEAD RESTRAINT

CROSS-REFERENCE TO RELATED APPLICATIONS

This application claims foreign priority benefits under 35 U.S.C. §119(a)-(d) to DE 10 2008 004 022.3, filed Jan. 11, 2008, which is hereby incorporated by reference in its entirety.

BACKGROUND OF THE INVENTION

1. Field of the Invention

The present invention relates to vehicle seats with adjustable head restraints.

2. Background Art

Various vehicle seats having height adjustable head restraints are disclosed in the art. Vehicle seats having retractable head restraints are also known in the art. One vehicle seat example is U.S. Pat. No. 6,390,558 B2, which issued to Fischer et al. on May 21, 2002. Another vehicle seat example is U.S. Patent Application Publication No. 2002/0079723 A1, which published to Risch et al. on Jun. 27, 2002. The disclosures of these references are incorporated in their entirety by reference herein.

BRIEF DESCRIPTION OF THE DRAWINGS

FIG. 8 is a schematic view of a portion of a height adjustment assembly in a first position for a head restraint of the vehicle seat of FIG. 1;

FIG. 9 is a top plan view of the mechanism of FIG. 8;

FIG. 10 is a schematic view of a portion of a height adjustment assembly in a second position for a head restraint of the vehicle seat of FIG. 1; and FIG. 11 is a top plan view of the mechanism of FIG. 10.

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
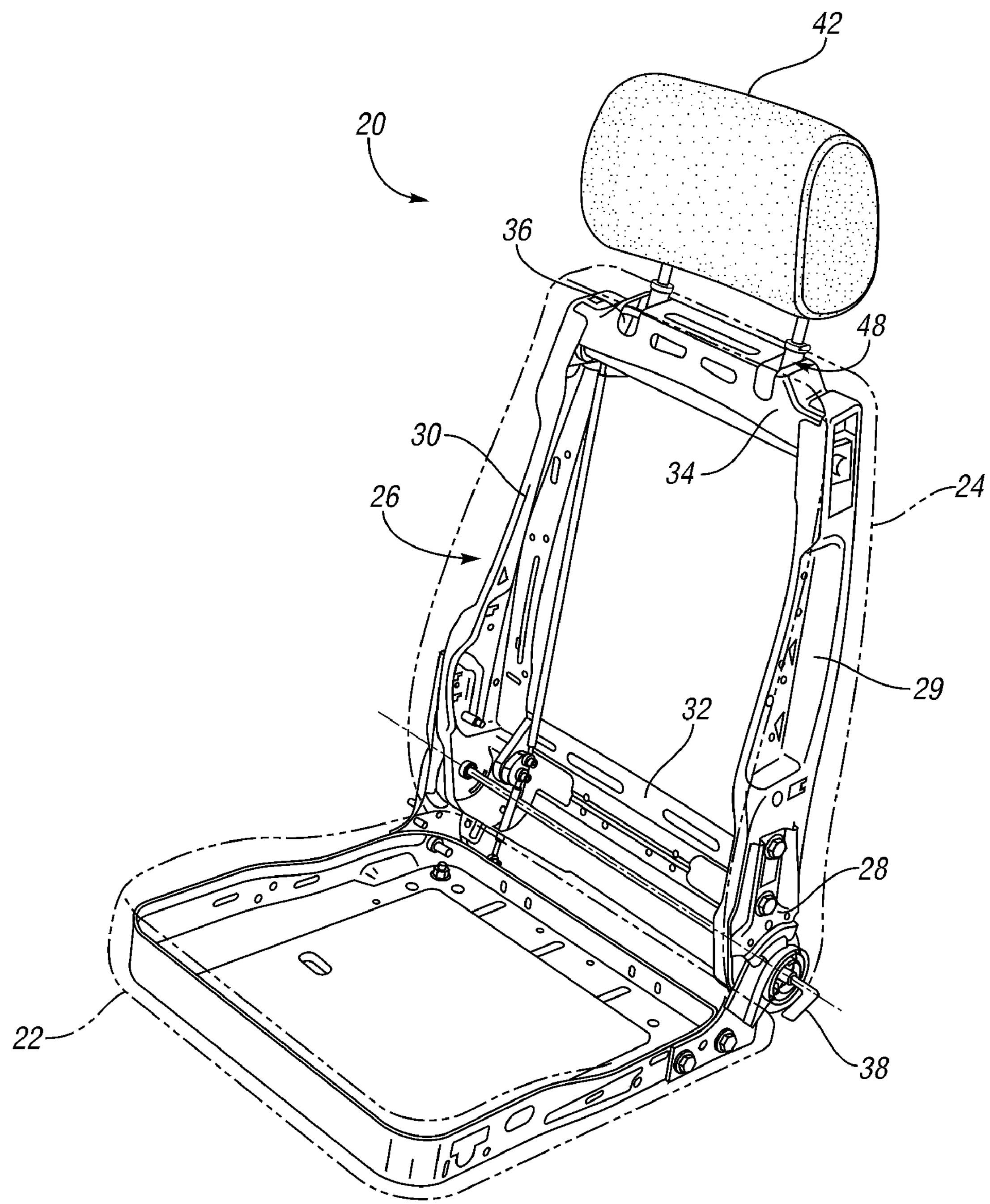
FIG. 1 is a perspective view of a partially assembled vehicle seat in accordance with the present invention.

With reference now to FIG. 1, a vehicle seat is illustrated and referenced generally by numeral 20 for use in a vehicle, such as an automobile, a boat or an aircraft. The seat 20 includes a seat bottom 22 that is mounted within the vehicle. The seat 20 also includes a seat back 24 that is mounted to one of the seat bottom 22 or the vehicle. The seat back 24 is illustrated partially disassembled with cushioning and a cover removed for revealing underlying components of the seat back 24. The seat back 24 includes a frame 26, which in the embodiment depicted is pivotally connected to the seat bottom 22 by a tilt mechanism 28.

The vehicle seat 20 may be provided anywhere within an associated vehicle, such as a front row seat, a second row seat, or the like. The seat bottom 22 may be mounted directly to the vehicle floor or coupled to seat adjuster mechanisms or rails extending longitudinally to the vehicle floor and enabling longitudinal, height, and angular adjustment of the seat bottom 22 relative to the vehicle floor. The seat bottom 22 is conventional in design and can be constructed in accordance with any suitable manner, including a structural frame covered by a foam pad layer and other finish cover material.

The frame 26 is formed from any suitable material that is sufficiently light in weight, yet structurally sound for supporting the occupant and for withstanding appropriate testing requirements. The frame 26 includes a pair of side members 29, 30, which are connected by a lower cross member 32, an upper cross member 34. In the description, various embodiments and operating parameters and components of the embodiments are described with directional language such as “left”, “right”, “above”, “below”, “upper”, “lower”, and words of similar import designate directions shown in the drawings or are understood in the field of the art. Such directional terminology is used for relative description and clarity and is not intended to limit the orientation of any embodiment, or component of an embodiment to a particular direction or orientation.

The frame members 29, 30, 32, 34 can be formed integrally or from separate components that are joined by any suitable manner, such as welding, stamping, fastening or the like to form the frame 26. The frame 26 is subsequently covered with foam or cushioning and a cover material to support the occupant. The side members 29, 30 are connected to the seat bottom 22 by the tilt mechanism 28. The tilt mechanism 28 is operated by the lever 38 on the back of the seat back 24. The tilt mechanism 28 may be any suitable mechanical or electromechanical reclining mechanism. For example, the tilt mechanism 28 may be embodied by the reclining mechanisms of the Fischer et al. U.S. Pat. No. 6,390,558 patent or the Risch et al. U.S. 2002/0079723 A1 patent application publication, which have been incorporated by reference herein.

A height adjustment assembly 40 is connected to the frame 26 and a head restraint 42 is mounted to the height adjustment assembly 40 and oriented above the seat back 24 for supporting the head of an occupant. The height adjustment assembly 40 is also retractable for lower the head restraint, for example, when the seat is flipped or folded. The height adjustment assembly is independent of the retraction, so that once the seat is returned to a normal position, the selected height adjustment, prior to retraction, is maintained. Therefore, unlike prior art retractable head restraints, the occupant is not required to readjust the height of the head restraint.

Figure 2:
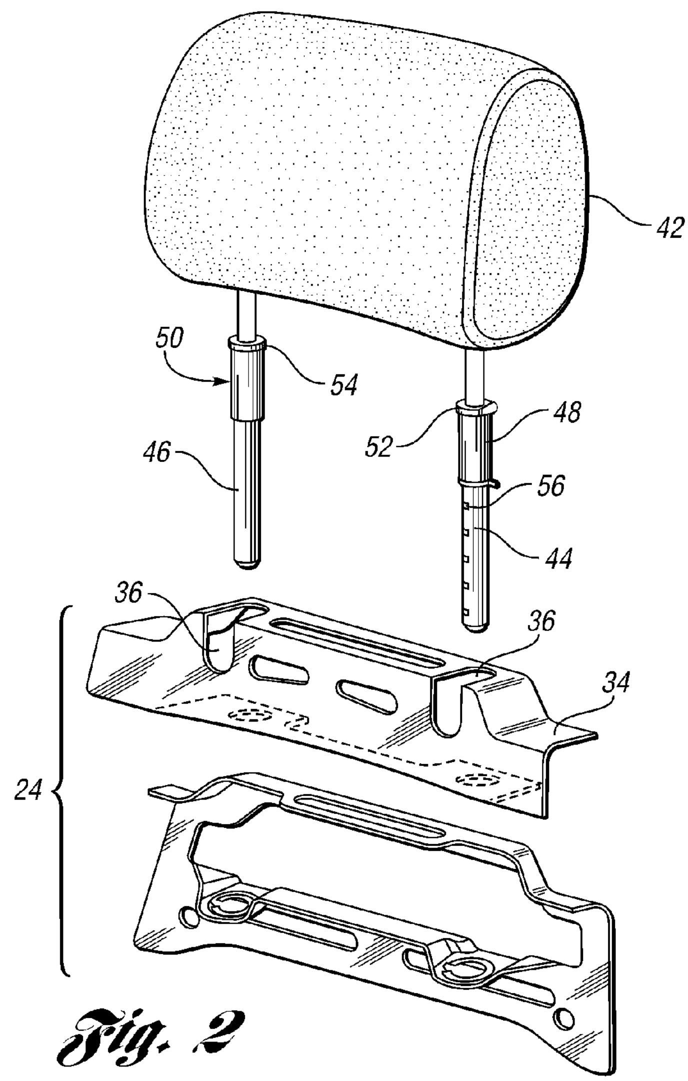
FIG. 2 is a partially exploded perspective view of a portion of the vehicle seat of FIG. 1.

Referring now to FIG. 2, the cooperation of the height adjustment assembly 40, head restraint 42 and frame 26 is illustrated in greater detail. The head restraint 42 includes a pair of rods 44, 46 extending therefrom. The frame 26 includes a pair of sleeves 48, 50 each mounted to the head restraint 42. The sleeves 48, 50 each include an end cap 52, 54 that is disposed above the seat back 24 over an external cover. The rods 44, 46 are each received within one of the sleeves 48, 50 for linear translation of the head restraint 42 relative to the frame 26.

The sleeves 48, 50 include a first end extending through one or more channels 36 provided in the upper frame member 34 of the seat back 24. It is contemplated that the one or more channels may be configured to allow the head rest 42 to move upward and/or forward to contact the head of an occupant by employing an active head restraint system to provide the actuation. Slots 36 may also be configured to provide limit stops for the one or more headrest sleeves 48, 50 as the sleeves 48, 50 move through the slots 36.

One of the rods 44, 46 includes a plurality of notches 56 formed on an outer surface that cooperate with and are releasably engaged by a locking mechanism 55, illustrated in FIG. 3 and discussed in further detail below. The notches 56 are disposed on the exterior surface of the shaft 44 at equally spaced apart intervals so that the notches will align the headrest into position.

Figure 3:
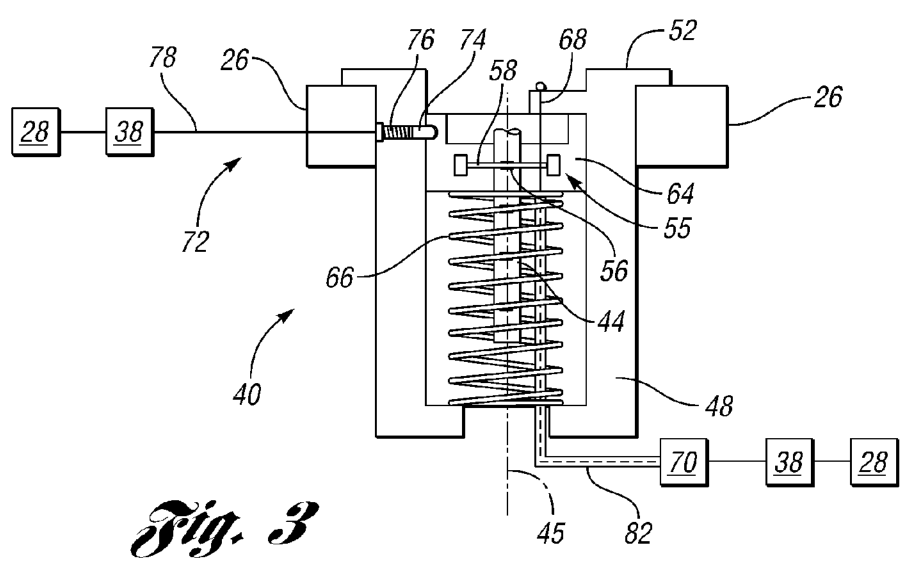
FIG. 3 is a schematic view of a height adjustment assembly for a head restraint of the vehicle seat of FIG. 1.

With reference now to FIG. 3, an embodiment of the height adjustment mechanism 40 is shown in greater detail. A guide 64 is mounted within the sleeve 48. The guide 64 can translate within the sleeve 48 and the sleeve 48 may limit the translation of the guide 64 with flanges provided on the distal ends of the sleeve 48. The guide 64 cooperates with the locking mechanism 55 so that the rod 44 can rotate about a center axis 45 between a locked position shown in FIG. 6*a*, and an unlocked position shown in FIG. 6*b*. Rotation of the rod 44 is provided by a mechanism disclosed in U.S. patent application Ser. No. 11/767712, which was filed by Muller et al. on Jun. 25, 2007, the disclosure of which is incorporated in its entirety by reference herein. In the locked position, the rod 44 cannot translate relative to the guide 64. In the unlocked position, the rod 44 can translate relative to the guide 64 so that a user may select a desired height for the head restraint 42, which corresponds with a notch 56 provided on the rod 44.

As illustrated, the guide 64 also cooperates with a release mechanism 72 to translate the rod 44 between an extended position and a retracted position. In the extended position, the guide 64 is engaged with the release mechanism 72. Likewise, in the extended position, the rod 44 is locked to the guide 64 so that the head restraint 42 can support the head of the user at a desired height selected by the user utilizing the locking mechanism 55. In the retracted position, the guide 64 is disengaged from the release mechanism 72 while the rod 44 is still locked to the guide 64 by the locking mechanism 55 so that the head restraint 42 and the rod 44 can move downward, which allows for compact storage of the head restraint 42 as desired by the user. When the user returns the guide 64 from the retracted position to the extended position, the height of the head restraint 42 is equivalent to the height before retraction of the head restraint 42 because the locking mechanism 55 maintains the notch position relative to the guide 64.

In one embodiment, the release mechanism 72 is connected to a lever 38 (illustrated in FIG. 1), which allows the user to operate the release mechanism. In another embodiment, the release mechanism 72 is connected to the reclining mechanism 28, which can be operated by the lever 38 so that when the user actuates the lever 38, the head restraint 42 is retracted to the retracted position while the seat back 24 pivots toward the seat bottom 22.

The release mechanism 72 has a pin 74 that is biased toward the guide 64 with a spring 76. The pin 74 and the spring 76 retain the guide 64 in the extended position illustrated. A cable 78 is connected to the pin 74 so that upon actuation of the cable 78, the pin is pulled from engagement with the guide 64. The cable may be a Bowden cable 78. In one embodiment, the cable 78 is connected to the lever 38 to allow the user to actuate the release mechanism 72.

Figure 5:
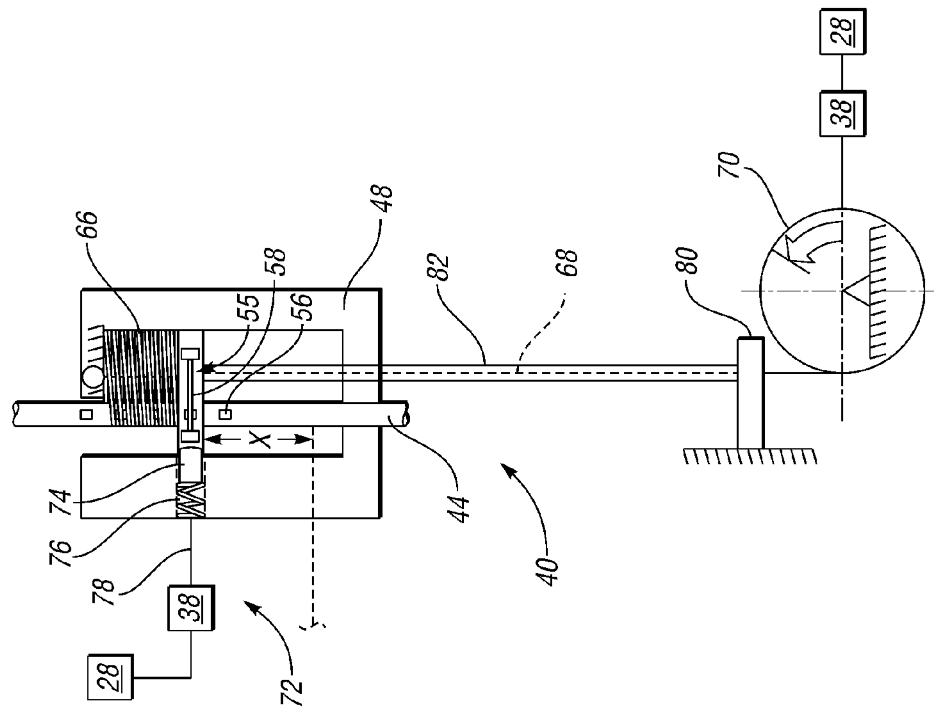
FIG. 5 is a schematic view of the portion of the height adjustment assembly of FIG. 4 illustrated in a second position.
Figure 4:
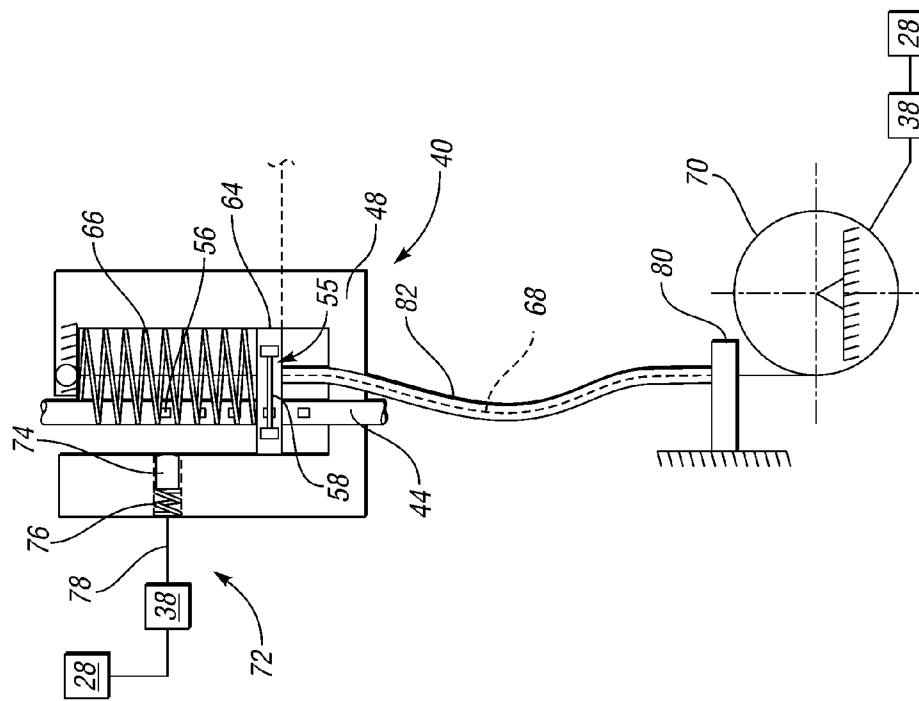
FIG. 4 is a schematic view of a portion of a height adjustment assembly in a first position for a head restraint of the vehicle seat of FIG. 1.

Once the pin 74 is disengaged from the guide 64, a spring 66 connected to the guide 64, biases the guide 64 downward toward the retracted position. The spring 66 is connected to the guide 64 at one end and the sleeve 48 at a second end. Of course, the spring 66 can be connected directly to any fixed point within the seat back 24, such as the frame 26. In the illustrated embodiment, the spring is a tension spring 66. As illustrated in FIGS. 4-5, the spring is a compression spring 66. Of course, any suitable biasing member 66 is contemplated within the scope of the present invention.

The guide 64 is automatically returned to the extended position by a cable 68 and since the locking mechanism 55 remains engaged with the guide 64, the height of the head restraint 42 is equivalent the height before the guide 64 was retracted. The cable 68 is mounted at a first end to the sleeve 48 in the illustrated embodiment, and alternatively can be directly mounted to the frame 26. A second end of the cable 68 is mounted within the frame 26 to a rotary actuator 70. In one embodiment, the rotary actuator is rope drum 70 having a pivot axis corresponding with the pivot axis of the seat back 24. The cable 68 is wrapped around the rope drum 70 so that as the rope drum 70 pivots, the cable 68 is released so that a sheath 82 about the cable pushes the guide 64 to the extended position. In one embodiment, the rope drum 70 is connected to the lever 38 so that actuation of the lever 38 in a first direction rotates the rope drum 70 in a first direction, which allows the release mechanism to translate the guide 64 toward the retracted position and actuation of the lever 38 in a second direction rotates the rope drum 70 in a second direction to return the guide 64 to the extended position.

With reference now to FIGS. 4-5, another embodiment of the height adjustment mechanism 40 is illustrated in the retracted position in FIG. 4, and illustrated in the extended position in FIG. 5. In the retracted position, the pin 74 is disengaged from the guide 64 by the cable 78. In the extended position, the guide 64 has traveled a distance X so that the pin 74 is engaged with the guide 64. The distance X that the guide travels between the retracted position and the extended position corresponds to a distance the cable 68 is rotated by the rope drum 70.

In the depicted embodiment, the cable is a Bowden cable 68. The Bowden cable 68 is fixed at a first end to the sleeve 48, and at a second end to the rope drum 70. The sheath 82 extends from the guide 64 to a fixed support 80 provided proximate the rope drum 70.

In the retracted position, illustrated in FIG. 4, the spring 66 is biasing the guide 64 downward. As illustrated, the spring 66 is a compression spring 66. In the extended position, illustrated in FIG. 5, the cable 68 is under tension thereby causing the cable and the sheath 82 to straighten. As the sheath 82 is straightened, the sheath 82 pushes the guide 64 upward a distance X until the pin 74 re-engages the guide 64 in the extended position. The cable 68 is under tension in the extended position because the rope drum 70 has rotated and pulled the cable 68 a distance corresponding to the distance X of the translation of the guide 64. By utilizing the spring 66 to retract the head restraint 42, the head restraint 42 can be retracted regardless of the height adjustment position. Thus, the head restraint 42 is retracted until it contacts the seat back 24. The flexibility of a spring 66 prevents a fixed retraction distance and provides compliance for various retraction lengths dictated by the range of height adjustment.

Figure 6A:
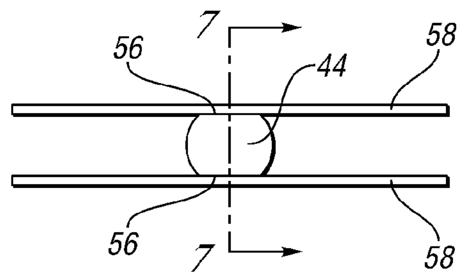
FIG. 6*a* is a top plan view of a mechanism of the height adjustment assembly of FIG. 3 illustrated in a first position.
Figure 6B:
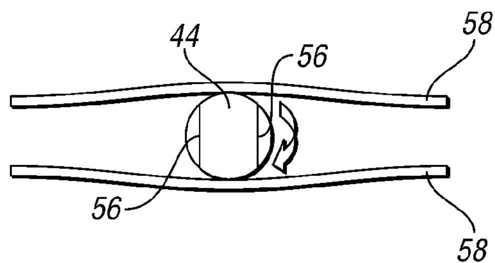
FIG. 6*b* is a top plan view of the mechanism of FIG. 6*a*, illustrated in a second position.

Referring now to FIGS. 6*a* and 6*b*, an embodiment of the locking mechanism 55 showing the cooperation of the wire spring 58 and the rod 44 is illustrated in greater detail. Engagement and disengagement of the locking mechanism 55 allows the user to select a desired height for the head restraint 42. When the user employs the locking mechanism 55, the guide 64 and the locking mechanism 72 are engaged.

As illustrated, the notches 56 are formed in opposed lateral sides of the rod 44. In a first locked position of the rod 44, the wire spring 58 transverse portions extend through the notches 56 for locking the guide 64 and head restraint 42 relative to the rod 44. In order to unlock the guide 64 and head restraint 42 from the rod 44, the rod 44 is rotated approximately ninety degrees as illustrated in FIG. 6*b*. As the rod 44 is rotated, notches 56 become disengaged from the transverse portions of the wire spring 58 by an external diameter of the guide shaft 58 that urges the wire spring 58 transverse portions outward as illustrated in FIG. 6*b*.

Figure 7:
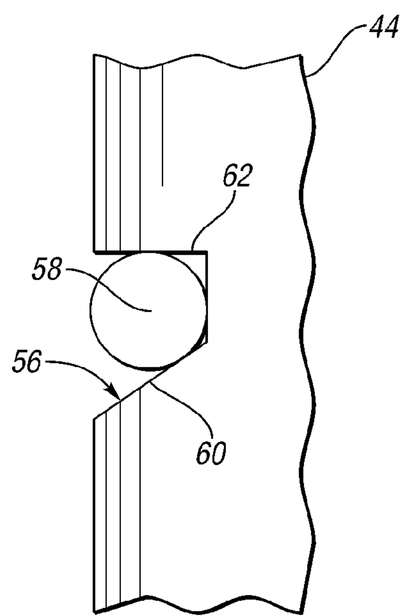
FIG. 7 is a partial section view taken along section line 7-7 in FIG. 6*a;*

Referring now to FIG. 7, one of the notches 56 is illustrated in greater detail. The notch 68 includes a leading edge 56 and a locking edge 62. The locking edge 62 prevents further upward travel of the wire spring 58, and consequently the guide 64 and head restraint 42 along the rod 44. Thus, locking edges 62 lock the wire spring 58 in predefined notch 56 positions along the rod 44. For example, the locking edge 62 can be provided on both edges of the lowermost notch 56 along the rod 44 to prevent inadvertent removal of the head restraint 42 and to prevent manual translation of the head restraint 42 to a position that would disconnect the guide 64 from the rod 44. Likewise, each intermediate notch 56 may be provided with the locking edge 62 on the lowermost edge to lock the guide 64 in position.

The leading edges 56 are provided at a lower edge of each notch 56, except the lowermost notch 56, to permit the user to adjust the head restraint 42 by translating the head restraint 42 upward without pivoting the rod 44. Thus, the user may adjust the head restraint 42 height upward by manually applying an upward force on the head restraint 42 thereby unlocking the guide 64 by urging the wire spring transverse portions 58 along the leading edges 56 and about the rod 44 until engaging the next sequential notch 56 or the lowermost notch 56. In order to move the head restraint 42 downward, towards or to the extended position, the user must rotate the rod 44 approximately ninety degrees as illustrated in FIG. 7*b*. Once the rod 44 is rotated, the user may manually adjust the height.

With reference now to FIGS. 8-11, another embodiment of the locking mechanism 55 showing the cooperation of the wire spring 58 and the rod 44 is illustrated. Again, engagement and disengagement of the locking mechanism 55 allows the user to select the desired height for the head restraint 42. When the user employs the locking mechanism 55, the guide 64 and the locking mechanism 72 remain engaged.

In FIGS. 8-9, the locking mechanism 55 is engaged with the rod 44 so that the head restraint 42 remains at a constant height. In FIGS. 10-11, the locking mechanism 55 is disengaged from the rod 44, which allows the user to move the head restraint 42 upward and downward to select a desired height for the head restraint 42. The desired height corresponds with one of the notches 56. Once the locking mechanism 55 is reengaged with another notch 56, the locking mechanism 55 locks the rod 44 at the height.

The locking mechanism 55 has a wire spring 58 mounted within the guide 64. The wire spring 58 does not wrap around both sides of the rod 44. Instead, the wire spring 58 extends across only one lateral side of the rod 44, which allows for a light-weight and low-cost locking mechanism 55. In one embodiment, the wire spring 58 has a flat portion formed therein that fits into, and can be retained within, the notch 56.

As illustrated, the wire spring 58 cooperates with a push button 84. The push button 84 is accessible to the user so that the user can push the push button 84 to move the wire spring 58 from engagement with the notch 56 of the rod 44. The push button 84 can be mounted in any suitable location on the seat back 24, such as upon the seat back 24. In FIGS. 8-9, the push button 84 does not engage the wire spring 58, so the rod 44 is locked into the desired height. In FIGS. 10-11, the push button 84 is engaged with the wire spring 58, thereby retracting the spring 58 from the notch 56 so that the rod 44 can move upward and downward, as indicated by the arrow proximate the rod 44. The push button 84 may have a biasing member provided therein or mounted proximate thereto to bias the push button 84 away from the wire spring 58 so that the user must overcome the force of the biasing member to engage the push button 84 with the wire spring 58.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat comprising:

a seat back including a frame;

a guide supported within the seat back frame for limited movement relative to the seat back frame between an extended position and a retracted position;

a biasing member provided within the seat back frame and connected to the guide to bias the guide to retract relative to the seat back frame toward the retracted position;

a cable having a first end mounted to a top portion of the seat back frame and a second end mounted to the bottom portion of the seat back frame, the cable cooperating with the guide to overcome the bias of the biasing member to extend the guide toward the extended position;

a rotary actuator mounted near the bottom portion of the seat back frame cooperating with the cable to extend and retract the cable;

a release mechanism cooperating with the guide to secure the guide in the extended position;

at least one rod extending from the seat back frame and having a plurality of notches provided therein for providing a series of height adjustment positions;

a locking member provided within the guide to cooperate with the plurality of notches to retain the at least one rod at one of the series of height adjustment positions; and a head restraint mounted on the at least one rod such that movement of the at least one rod creates movement of the head restraint;

wherein actuation of the release mechanism and the rotary actuator releases the guide so that the guide and the at least one rod are retracted by the biasing member to retract the head restraint relative to the seat back, and return actuation of the rotary actuator returns the guide and the at least one rod to the extended position by extending the cable to extend the head restraint relative to the seat back.

2. The vehicle seat of claim 1 further comprising a sheath mounted to the guide at a first end and the rotary actuator at a second end and having a portion of the cable provided therein.

3. The vehicle seat of claim 2 wherein the rotary actuator is rotatable in a first direction such that the cable is under tension to extend the sheath to push the guide toward the top portion of the seat back frame.

4. The vehicle seat of claim 1 further comprising an actuator provided on the seat back that is translatable to cooperate with the locking member of the guide such that actuation of the actuator disengages the locking member from the one of the plurality of notches to allow the at least one rod to be moved relative to the seat back in an axial direction of the at least one rod.

5. The vehicle seat of claim 4 wherein the actuator further comprises a push button actuatable by depressing the push button toward the at least one rod.

6. The vehicle seat of claim 1 wherein the release mechanism further comprises a pin mounted within the seat back frame such that the pin is extendable into the guide.

7. The vehicle seat of claim 6 wherein the release mechanism further comprises a cable connected to a release lever and the pin such that actuation of the release lever pulls the cable to consequently pull the pin from engagement with the guide.

8. The vehicle seat of claim 7 wherein the release mechanism further comprises a second biasing member mounted within the seat back and connected to the pin to bias the pin toward engagement with the guide.

9. The vehicle seat of claim 8 wherein the release lever cooperates with a recliner mechanism to actuate the seat back to pivot about an axis.

10. The vehicle seat of claim 1 further comprising a sleeve mounted within the seat back to receive and retain the guide therein.

11. The vehicle seat of claim 10 wherein the sleeve extends above the seat back frame.

12. The vehicle seat of claim 10 wherein the pin of the release mechanism is mounted within the sleeve.

13. The vehicle seat of claim 10 wherein the biasing member is mounted to the sleeve and the guide.

14. The vehicle seat of claim 1 wherein the locking member further comprises a spring wire having a portion sized to be received within one of the plurality of notches.

15. A vehicle seat comprising:

a seat bottom;

a seat back including a frame;

a guide supported within the seat back frame for limited movement relative to the seat back frame between an extended position and a retracted position;

a biasing member provided within the seat back frame and connected to the guide to bias the guide to retract relative to the seat back frame toward the retracted position;

a cable having a first end mounted to a top portion of the seat back frame and a second end mounted to the bottom portion of the seat back frame, the cable cooperating with the guide to overcome the bias of the biasing member to extend the guide toward the extended position;

a rotary actuator mounted near the bottom portion of the seat back frame cooperating with the cable to extend and retract the cable;

a release mechanism cooperating with the guide to secure the guide in the extended position;

at least one rod extending from the seat back frame and having a plurality of notches provided therein for providing a series of height adjustment positions;

a locking member provided within the guide to cooperate with the plurality of notches to retain the at least one rod at one of the series of height adjustment positions; and a head restraint mounted on the at least one rod such that movement of the at least one rod creates movement of the head restraint;

wherein actuation of the release mechanism and the rotary actuator releases the guide so that the guide and the at least one rod are retracted by the biasing member to retract the head restraint relative to the seat back as the seat back pivots relative to the seat bottom, and return actuation of the rotary actuator returns the guide and the at least one rod to the extended position by extending the cable to extend the head restraint relative to the seat back as the seat back pivots relative to the seat bottom.

16. The vehicle seat of claim 15 further comprising a reclining mechanism configured to adjustably position the seat back relative to the seat bottom.

17. The vehicle seat of claim 16 wherein the release mechanism cooperates with the reclining mechanism to release the head restraint when the reclining mechanism is actuated to position the seat back adjacent to the seat bottom.

18. The vehicle seat of claim 15 wherein the release mechanism further comprises a cable connected to a release lever and the pin such that actuation of the release lever pulls the cable to consequently pull the pin from engagement with the guide.

* * * * *